(No Model.)
2 Sheets—Sheet 1.
E. R. HUTCHINS.
REFRIGERATOR TANK CAR.
No. 474,603.  Patented May 10, 1892.
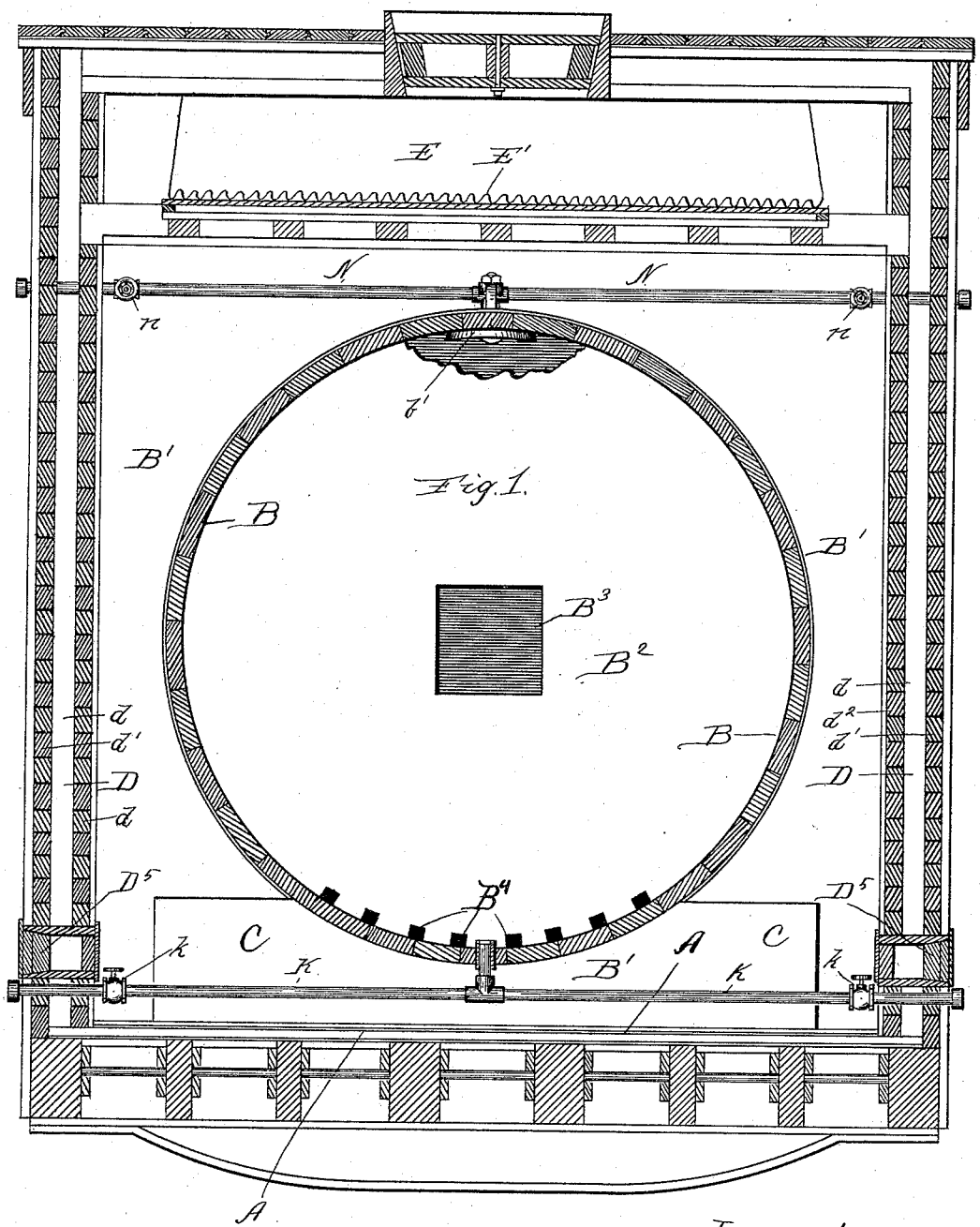
Witnesses:
Mack A. Claflin
H. W. Munday
Inventor:
Eugene R. Hutchins
By Munday, Evarts & Adcock
his Attorneys (No Model.) 2 Sheets—Sheet 2.
E. R. HUTCHINS.
REFRIGERATOR TANK CAR.
No. 474,603. Patented May 10, 1892.
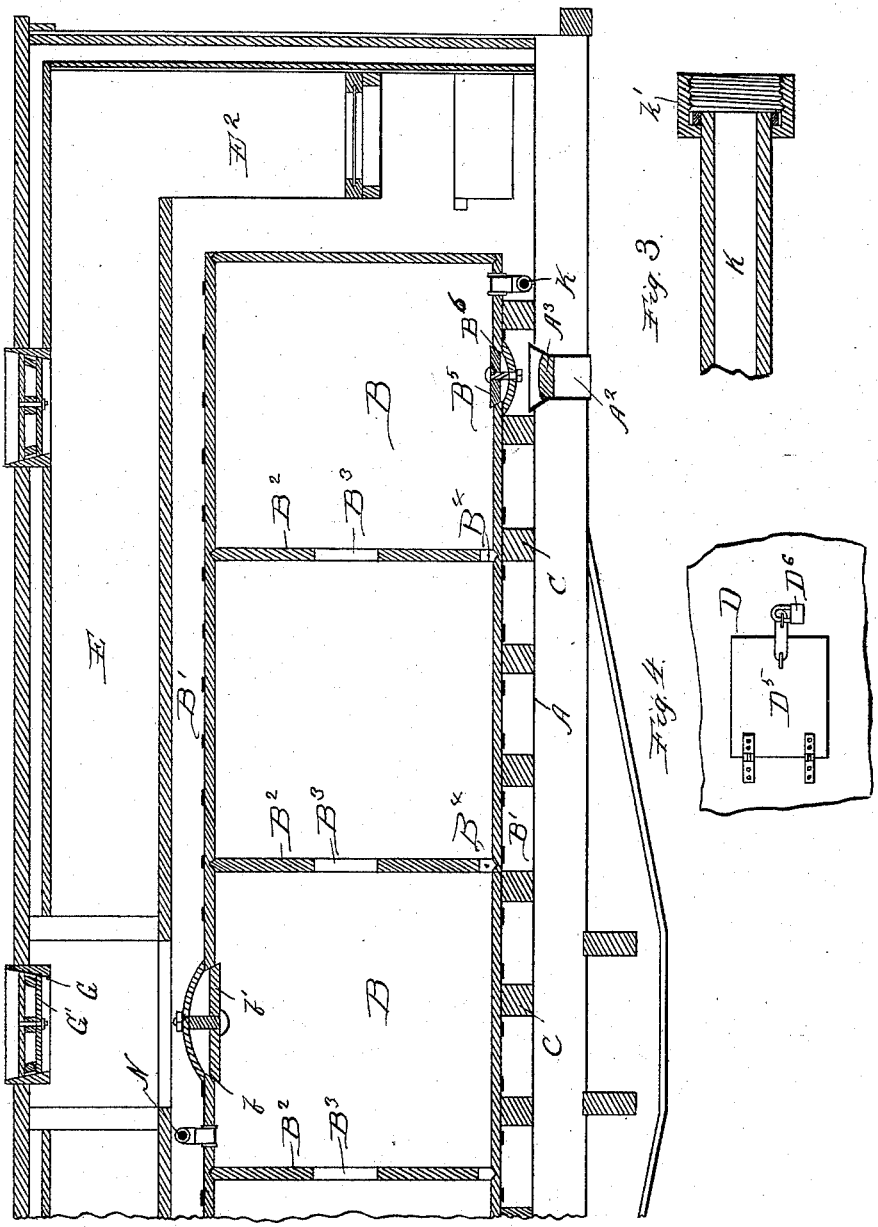
Witnesses:
Mack A. Claflin.
H. M. Munday
Inventor:
Eugene R. Hutchins.
By Munday, Evarts & Adcock
his Attorneys.

UNITED STATES PATENT OFFICE.

EUGENE R. HUTCHINS, OF CHICAGO, ILLINOIS, ASSIGNOR TO THE HUTCHINS REFRIGERATOR CAR COMPANY, OF SAME PLACE.

REFRIGERATOR-TANK CAR.

SPECIFICATION forming part of Letters Patent No. 474,603, dated May 10, 1892.

Application filed January 25, 1889. Serial No. 297,574. (No model.)

*To all whom it may concern:*

Be it known that I, EUGENE R. HUTCHINS, a citizen of the United States, residing in Chicago, in the county of Cook and State of Illinois, have invented a new and useful Improvement in Refrigerator-Tank Cars, of which the following is a specification.

Heretofore it has been customary to prevent beer from freezing in winter and to keep it cool in summer to ship it and other like liquids in casks or barrels placed in refrigerator-cars, the casks or barrels being taken out of the car at the point of destination and reshipped to the brewery after the beer has been used therefrom. In this old method it is usually necessary, also, in summer time to pack the casks in ice, in order to keep the beer at a proper temperature. The weight of the casks almost equals the weight of the beer shipped in them, so nearly half the total freightage out is in one sense lost, and when there is added to this loss the cost of shipping back the empty casks it will be understood that the freight charge or expense incident to shipping beer and other like liquids which require to be kept at a certain temperature is very great. By this old method of shipment it is also found in practice very difficult, as well as expensive, to ship beer to great distances, owing to the liability of the ice giving out during long runs and to the delays to which freight-trains are always subject.

It is the object of my invention to provide a car in which beer or other liquids requiring to be kept at a certain temperature may be safely and economically shipped and the expense incident to the shipment and reshipment of the bulky and heavy beer casks or barrels may be entirely avoided, as well as the time, labor, and inconvenience incident to handling such casks and putting them in and out of the car.

To this end my invention consists in a tank-shaped car adapted to contain the beer or liquid in bulk and into which the beer may run or be drawn directly from the vats in the brewery, said tank being surrounded on all sides by an outer non-conducting shell or wall, like the walls of a refrigerator-car. An ice chamber or rack is provided within said outer non-conducting wall, and preferably above and at the ends of the tank, so that the cold air from the ice may circulate all around the tank or have access to every part thereof. The tank is provided with a large manhole, preferably at the top near the middle, through which a workman may enter for the purpose of cleansing the same after each shipment. For purposes of cleansing, also, the tank is provided with a washout hole or opening at its bottom. The beer or liquid is drawn off from the tank-car through suitable exit-pipes, which are extended out through the non-conducting outer walls and lead from the bottom of the tank. These discharge-pipes are preferably four in number, one extending out at each of the four corners of the car, so that the liquid may be drawn from either side or end of the car, as may be more convenient, or from all four at once, if desired. Each of these discharge-pipes is furnished with a coupling adapted to be secured to a hose or other pipe, through which the beer may be delivered from the tank-car into the ordinary casks or barrels at the point of destination. The tank-car may preferably be of a cylindrical shape, though its form may be varied without departing from the principle of my invention. I prefer to construct or mount the tank-car so that it will rest horizontally upon the car trucks or platform, as thereby the car as a whole may be constructed more cheaply and at the same time given greater strength and rigidity.

The particular construction which I prefer to employ in practicing my invention for the outer non-conducting shell or wall of the car which surrounds the tank and for the ice-chamber and rack is that shown and described in Letters Patent No. 339,184, to C. B. Hutchins, and dated April 6; but my invention may be used with any other construction or form of refrigerator-car walls and ice-chamber racks or supports now commonly in use or known to those skilled in the art.

My refrigerator-tank car thus consists, essentially, of a double car-body, the inner car-body being a cylindrical tank adapted to hold the liquid load of the car and to receive and discharge such load without removing the tank from the car, and the outer car-body being an ordinary construction of refrigerator-car and comprising non-conducting walls at sides, ends, floor, and roof and provided with an ice chamber or rack at the top thereof, and a refrigerating or cooling chamber below such ice chamber or rack and within which the inner tank-body is suspended or supported on saddles above said floor, so that the cold air from the ice-chamber may circulate all around the inner tank-body of the car and come in contact with every portion thereof.

In the accompanying drawings, which form a part of this specification and in which similar letters of reference indicate like parts, Figure 1 is a cross-section of my refrigerator-tank car. Fig. 2 is a longitudinal section. Fig. 3 is a detail view of one of the discharge or draw-off pipes; and Fig. 4 is a detail view of one of the hand-hole doors, through which the hand may be inserted to open or close the valve in the discharge-pipe.

In said drawings, A represents a car-platform, B the inner tank-shaped body of the car, and C the series of saddles or supports on the platform, upon which the tank B rests and by which it is supported to leave a space B' beneath, so that the cold air may come in contact with the lower side or part of the tank as well as the rest of its circumference.

D represents the outer non-conducting car body or wall which surrounds the tank B. The non-conducting walls D at the sides, ends, and top or roof of the car may be of any ordinary construction commonly employed in refrigerator-cars; but I prefer to employ, and have therefore shown in the drawings, the particular construction of the walls D, and also of the platform or floor A, which is shown and described in said patent to Hutchins, before referred to. The construction of these parts is now well known to those skilled in the art, and it is not necessary, therefore, to here describe the same in detail. For a complete description of these parts reference is hereby made to said Hutchins patent. The walls D are double, the space $d$ between the outer and inner walls $d'$ $d^2$ thereof being filled in with a non-conducting material, preferably woolen rags cut into fine shreds.

E represents the ice rack or chamber above the tank B, and E' is the corrugated iron lining or pan upon which the ice rests. $E^2$ is an extension of the ice chamber or rack, one at each end of the car. The roof or top D' of the car is provided with a manhole or opening G, closed by a door G', through which the workmen may enter for purposes of cleaning out or repairing it. The tank B is likewise provided with a manhole $b$, preferably near its top and at the middle, closed by a plug or device $b'$ in the usual manner, through which manhole the workmen may enter the tank for the purpose of cleaning, repairing, &c. The ice rack or chamber E is made in two parts or provided with a central opening under the door G, so that a workman may descend through the same. The tank B is preferably made of wooden staves and surrounded by hoops, though it may be made of any other suitable construction or material. It may also be provided with partitions $B^2$, preferably having openings $B^4$ through the same to admit of the liquid flowing from one partition to the other. The partitions are also furnished with central manholes $B^3$ for passage of workmen in cleaning and repairing. These partitions may be of open screen-work. They are designed to prevent undue movement of the liquid about within the tank.

$B^6$ is the washout-opening closed by a suitable plug $B^5$. Washout-openings are preferably provided one at each end of the car. A similar opening $A^2$, closed by a plug $A^3$, extends through the platform of the car for the discharge of the water in washing out the tank.

The discharge or draw-off pipes K are each provided with cocks or valves $k$ inside the non-conducting wall D of the car, so that the valves cannot be opened except through the hand-hole door $D^5$, which is closed and kept locked, preferably by seal-locks $D^6$. The seal-locks are of the ordinary construction commonly used upon freight-car doors and need no description. The discharge-pipes K extend out through the wall D of the car and are provided with couplings $k'$ of the usual construction, by which said pipes may be connected by a pipe or hose leading to the cask to be filled.

N N are the filling-pipes leading into the tank B at its top and preferably near its middle, one at each side. These filling-pipes N are each provided with valves $n$, and they extend out through the wall D of the car, the same as the discharge-pipes K. If preferred, the filling-pipes may extend down through the manhole or door G in the top or roof of the car.

The cold-air space B' between the tank B and the walls of the refrigerator-car extends all around the tank at the top, bottom, sides, and ends of the car and should be made wide enough to permit a workman to pass entirely around the car-walls D. The cold-air space or cooling-chamber B', below the ice-chamber E and within which the tank-car body B is suspended or supported, has free communication with said ice-chamber through the open space or passage $E^2$ at the sides of the ice chamber or rack, so that the air cooled by contact with the ice may freely descend into and through the cooling-chamber B' and all around the tank-car body B.

The construction of and the free communication between the ice-chamber and the cooling-chamber is fully shown and described in said Hutchins patent, No. 339,184, before referred to.

The valves $n$ in the filling-pipe N may be opened or closed by the workman entering the cooling-chamber B' of the refrigerator-car body through the opening G in the top or roof thereof, or through the side doors of the refrigerator-car body if the same is provided therewith, which is usually the case. The space between the inner tank-shaped car-body B and the outer body D is sufficient to enable the workman to pass all around the tank-car body B, as before stated.

I claim—

1. The refrigerator-tank car herein shown and described, consisting in the combination, with an outer car-body having non-conducting walls composed of double walls with an insulating-packing between, an ice rack or chamber at the top, a refrigerating-chamber below said ice rack or chamber and having direct communication therewith, of an inner liquid-containing tank-car body mounted within said refrigerating-chamber and permanently fixed and supported above the floor or platform of the car, with a cold-air space between the bottom of said tank and said floor or platform, so that the cold air descending from the ice-chamber above down to and through said refrigerating-chamber may circulate all around said tank at top, bottom, and sides thereof, said tank being provided with inlet and outlet pipes, so that said car may be loaded and unloaded as a tank-car without removing the tank from its supports, and also furnished with a large inlet or manhole and a large exit or flushing-hole to permit the proper cleaning of the tank, substantially as specified.

2. The refrigerator-tank car herein shown and described, consisting in the combination, with an outer car-body having non-conducting walls composed of double walls with an insulating-packing between, an ice rack or chamber at the top, a refrigerating-chamber below said ice rack or chamber and having direct communication therewith, of an inner liquid-containing tank-car body mounted within said refrigerating-chamber and permanently fixed and supported above the floor or platform of the car, with a cold-air space between the bottom of said tank and said floor or platform, so that the cold air descending from the ice-chamber above down to and through said refrigerating-chamber may circulate all around said tank at top, bottom, and sides thereof, said tank being provided with inlet and outlet pipes, so that said car may be loaded and unloaded as a tank-car without removing the tank from its supports, and also furnished with a large inlet or manhole and a large exit or flushing-hole to permit the proper cleaning of the tank, said inlet and outlet pipes projecting through the double walls of said refrigerator-car, and the roof and floor or platform of said car having openings closed by doors registering with said large inlet and outlet holes, substantially as specified.

3. In a refrigerator-tank car, a refrigerator-car having non-conducting walls, floor, and roof composed of double walls with an insulating-packing between, an ice-chamber at the top thereof, and a refrigerating or cooling chamber below the ice-chamber, combined with an inner tank-shaped car-body for holding the liquid load of the car permanently fixed and mounted within said refrigerating-chamber, and saddles or supports for supporting said tank above the car-floor, there being an open air-space all around said tank at bottom, top, sides, and ends thereof, so that the air cooled by the ice may come in direct contact with said tank all around the same, said tank being provided with transverse partitions furnished with connecting-openings through the same, substantially as specified.

EUGENE R. HUTCHINS.

Witnesses:
H. M. MUNDAY,
LEWIS E. CURTIS.